United States Patent [19]

Masuda et al.

[11] Patent Number: 5,198,294
[45] Date of Patent: Mar. 30, 1993

[54] COMPOSITE AIR-FILTERING MATERIAL

[75] Inventors: Takuichiro Masuda, Saitama; Norio Umezu, Fukaya; Yutaka Saisho, Asaka, all of Japan

[73] Assignee: Dynic Corporation, Kyoto, Japan

[21] Appl. No.: 732,070

[22] Filed: Jul. 18, 1991

[51] Int. Cl.5 .......................... B32B 5/06; B32B 5/32; B01D 39/16

[52] U.S. Cl. ..................... 428/300; 28/104; 28/112; 55/528

[58] Field of Search .................... 28/104, 112; 55/528; 428/300

[56] References Cited

U.S. PATENT DOCUMENTS 4,145,468 3/1979 Mizoguchi et al. .................. 28/104
4,883,709 11/1989 Noyaki et al. ....................... 28/104

Primary Examiner—James C. Cannon
Attorney, Agent, or Firm—Dann, Dorfman, Herrell and Skillman

[57] ABSTRACT

An air-filtering material exchangeably attached to a home-use or automobile air filter comprises a water jet type nonwoven fabric at an air outlet side and another type nonwoven fabric or fiber assembly at an air inlet side. These nonwoven fabric sheets are laminated on one another by needle punching. The water jet type nonwoven fabric is made from crowded finer fiber staples, and bits formed therein by penetration of needles of a needle punching machine may be stopped up by centripetally moving fiber staples surrounding the bits.

3 Claims, 1 Drawing Sheet

COMPOSITE AIR-FILTERING MATERIAL

BACKGROUND OF THE INVENTION

1. Field of the Invention

The present invention relates to an air-filtering material adapted to be exchangeably attached to an air filter, particularly an air filter mounted in an automobile engine, and having improved cleaning efficiency or dust collectability.

2. Prior Art

Among various prior art air-filtering materials, it has been proposed to employ a nonwoven fabric of a type in which fiber staples are interlocked with each other by needle punching to form a sheet-like web. Such needle punching type nonwoven fabrics, however, inherently include a number of bits formed by penetration of needles of a needle punching machine. Since the needles of the needle punching machine have relatively large diameter and are relatively widely spaced each other, the bits once formed by penetration of the needles could not be filled up by centripetal movement of the fiber staples surrounding the bits. When the bits remain in the needle punching type nonwoven fabric its air-filtering efficiency would be greatly degraded.

Although some attempts have been made to minimize the needle bits by selecting kind and diameter of the staple fibers, no remarkable improvement could yet be found. It has also been attempted that the fiber staples are impregnated with resin to substantially stop up the needle bits. This will surely improve the dust collectability but shorten a life span of the air-filtering material due to a greater power loss.

SUMMARY OF THE INVENTION

It is therefore an object of the present invention to provide an improved air-filtering material capable of eliminating defects and disadvantages of the prior arts.

Another object of the present invention is to provide a composite fabric assembly for use as an air-filtering material which is subjected to needle punching and, nevertheless, has excellent cleaning efficiency and life span, which have been recognized as contradictory factors in the prior art air-filtering materials.

The present invention is predicated upon the discovery that a water jet type nonwoven fabric wherein fine fiber staples are interlocked with each other by water jet method has a favorable characteristic when used as one of layered sheet materials of a composite air-filtering material. More particularly, since the fine fiber staples are assembled in a crowded condition in a web of the water jet type nonwoven fabric, even when the water jet type nonwoven fabric is subjected to needle punching so that a plurality of bits are formed therein by penetration of the needles, the staples surrounding bits will thereafter moves centripetally to substantially fill up the bits. Thus, the water jet type nonwoven fabric is suitably applicable to an air-filtering material capable of collecting and absorbing fine dust such as carbon particles contained in the atmospheric air or in a gas exhausted from an automobile, even after having been subjected to needle punching. This indicates that the water jet type nonwoven fabric may be laminated on another type nonwoven fabric, which may be a needle punching type nonwoven fabric, by needle punching without degrading its excellent cleaning efficiently particularly suitable to removal of fine dust.

In accordance with the invention, therefore, there is provided an air-filtering material comprising at least one nonwoven fabric wherein fiber staples are interlocked with each other by water jet method and at least one fiber assembly, the nonwoven fabric being laminated on the fiber assembly by needle punching and positioned on an air outlet side.

The fiber assembly positioned on an air inlet side is prepared by fibers having relatively greater diameters which are relatively thinly gathered, to thereby function in main to collect dust having larger diameters. The fiber assembly may comprises a nonwoven fabric wherein fiber staples in a web are interlocked with each other by needle punching which has been solely used to constitute the prior art air-filtering material. The fibers constituting the fiber assembly at the air inlet side may be polyester staples having an average diameter of about 5-20 denier, for example. The fiber density of the air-inlet side fiber assembly may be about 60-200 g/m$^2$.

The nonwoven fabric at the air-outlet side is prepared from relatively fine fiber staples which are densely assembled and interlocked with each other by water jet method. Water jet method is one of the known methods for interlocking the fiber staples in a web to prepare a nonwoven fabric. The fiber staples employed in the water jet type nonwoven fabric have an average diameter smaller than that of the fiber staples in the air-inlet layer material. Preferably, the average diameter of the fiber staples in the water jet type nonwoven fabric is about 2 denier or smaller. The nonwoven fabric produced in accordance with the water jet method can be assigned a fiber density considerably higher than that of the air-inlet side fiber assembly which may be a needle punching type fabric. Preferably, the fiber density of the air-outlet side, water jet type nonwoven fabric ranges from 80-100 g/m$^2$.

The water jet type nonwoven fabric is superposed on the fiber assembly and connected thereto by needle punching. A number of bits are inevitably formed in the water jet type nonwoven fabric, as well as in the fiber assembly, by penetration of needles of a needle punching machine. After the needle punching is completed, the bits in the fiber assembly such as a needle punching type nonwoven fabric would remain as they are. In the water jet type nonwoven fabric, however, the fiber staples surrounding the bits tend to move centripetally to make smaller or substantially stop up the bits. Thus, even after having been laminated onto the fiber assembly by needle punching, the water jet type nonwoven fabric will maintain its high fiber density and include no considerable bit, which may therefore serve as an air-outlet layer capable of collecting fine particles such as carbon particles contained in the air which can not be absorbed by the air-inlet layer of the fiber assembly.

BRIEF DESCRIPTION OF THE DRAWINGS

Other objects and advantages of the invention will be understood from the following description when read in conjunction with the accompanying drawings in which.

DETAILED DESCRIPTION OF THE EMBODIMENTS

Figure 1:
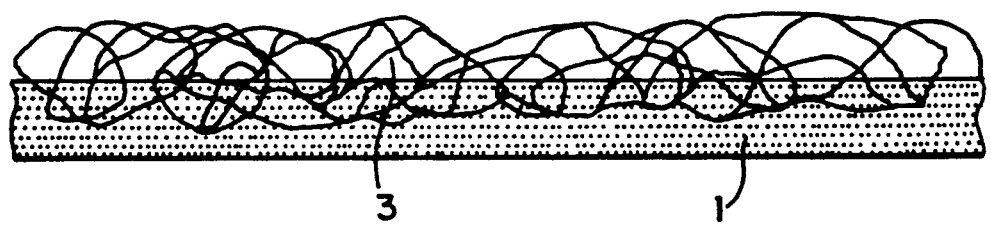
FIG. 1 is a schematic view of an air-filtering material embodying the invention.

FIG. 1 shows an example of laminated construction of the air-filtering material of this invention, which is prepared by an air-inlet layer 3 comprising a needle punching type nonwoven fabric made from polyester staples having average diameter of 5–20 denier and assembled in a fiber density of 60–200 g/m$^2$, and an air-outlet layer 1 comprising a water jet type nonwoven fabric made from fine polyester staples having an average diameter of 1–2 denier, which is laminated onto the air-inlet layer 3 by needle punching.

Figure 2:
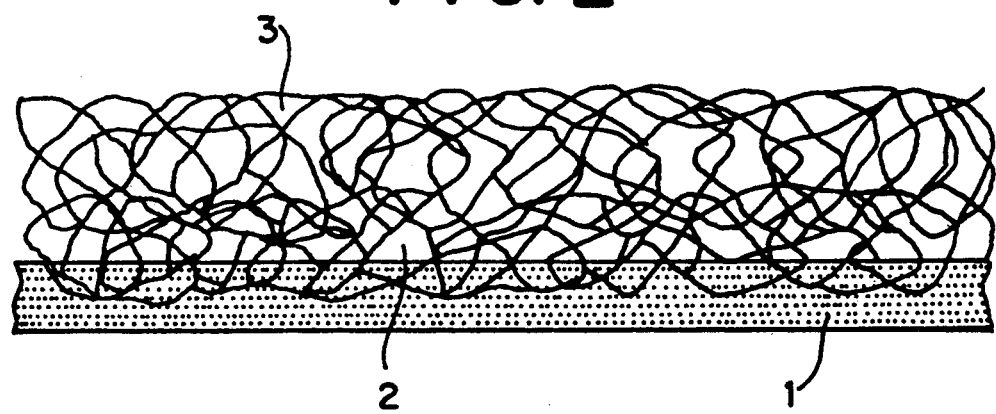
FIG. 2 is a schematic view showing another embodiment of the invention.

Another example shown in FIG. 2 further comprises a secondary air-inlet layer or intermediate layer 2 comprising a needle punching type nonwoven fabric made from polyester staples having an average diameter of 2–6 denier and assembled in a fiber density of 100–130 g/m$^2$. The water jet type nonwoven fabric layer 1 and the needle punching type nonwoven fabric layers 2 and 3 are laminated on one another to form a composite air-filtering material.

The invention will further be described by way of the following examples.

EXAMPLE 1

A water jet type nonwoven fabric (produced by Shinwa K. K., Trade Name PF880, made from 100% polyester staples having average fiber diameter of 1.5 denier, web density of 80 g/m$^2$) was used as an air-outlet layer. Polyester staples having an average fiber diameter of 3 denier and an average length of 51 mm were assembled in a density of 210 g/m$^2$ to form a web and the web is subjected to pre-punching with a loose punching density followed by finish-punching to prepare a needle punching type nonwoven fabric. The water jet type nonwoven fabric and the needle punching type nonwoven fabric were laminated one another and subjected to needle punching from the side of the water jet type nonwoven fabric to obtain a double-layered sheet material as shown in FIG. 1. This sheet material is then impregnated with 120% in weight (in wet condition) of an aqueous compound having the following composition:

| | |
|---|---|
| POLYZOL AT-115-45 (produced by Showa Kobunshi K.K.) | 15 parts in weight |
| SUMITEX RESIN M-3 (produced by Sumitomo Kagaku Kogyo K.K.) | 3 parts in weight |
| SUMITEX ACCELERATOR ACX (produced by Sumitomo Kagaku Kogyo K.K.) | 0.3 parts in weight |
| Water | 81.7 parts in weight |

The impregnating compound was then dried by hot air of 160°–170° C. temperature. Thus, an air-filtering material of 321 g/m$^2$ in weight and 2.4 mm in thickness was produced.

EXAMPLE 2

A water jet type nonwoven fabric (produced by Shinwa K. K., Trade Name 7380, made from 50% polyester and 50% rayon staples having average fiber diameter of 1.5 denier, web density of 80 g/m$^2$) was used as an air-outlet layer. As an intermediate layer, a needle punching type nonwoven fabric was prepared in such manner that polyester staples having an average fiber diameter of 2 denier and an average length of 51 mm and another polyester staples of 3 denier×51 mm length were mixed together at a ratio of 70:30 and assembled in a fiber density of 120 g/m$^2$, and a resulting web is subjected to pre-punching with a loose punching density, followed by finish-punching. An air-inlet layer comprised another needle punching type nonwoven fabric prepared from polyester staples of 6 denier×51 mm length, a web density of 85 g/m$^2$.

The intermediate layer was overlaid with the air-outlet layer by needle punching, onto which the air-inlet layer was then superposed and laminated by needle punching, to obtain a triple-layered sheet material as shown in FIG. 2. This sheet material is then resin-impregnated in the same manner as in Example 1 to finally obtain an air-filtering material of 316 g/m$^2$ in weight and 2.5 mm in thickness.

EXAMPLE 3

In this example, laminated two sheets of water jet type nonwoven fabrics were used as a composite air-outlet layer. The outermost layer was a water jet type nonwoven fabric produced by Shinwa K. K., Trade Name PF840, made from 100% polyester staples having average fiber diameter of 1.5 denier, web density of 40 g/m$^2$ and another one was produced by Shinwa K. K., Trade Name 7860, made from 100% polyester staples of 1.5 denier and 60 g/m$^2$ density. The intermediate layer and the air-inlet layer were prepared in the same manner as in Example 2 and a quaternary air-filtering material of 338 g/m$^2$ in weight and 3.0 mm in thickness was obtained by the same needle punching and the same resin impregnation.

EXAMPLE 4

A water jet type nonwoven fabric (produced by Shinwa K. K., Trade Name PF810, made from 100% polyester staples having average fiber diameter of 1.5 denier, web density of 100 g/m$^2$) was used as a single air-outlet layer. As an intermediate layer, a needle punching type nonwoven fabric was prepared in such manner that polyester staples having an average fiber diameter of 2 denier and an average length of 51 mm and another polyester staples of 3 denier×51 mm length were mixed together at a ratio of 70:30 and assembled in a fiber density of 100 g/m$^2$, and a resulting web is subjected to pre-punching with a loose punching density, followed by finish-punching. An air-inlet layer comprised another needle punching type nonwoven fabric prepared from 80% polyester staples of 6 denier×51 mm length and 20% polyester staples of 8 denier×64 mm length, which were mixed together to form a web in a fiber density of 80 g/m$^2$.

The intermediate layer was overlaid with the air-outlet layer by needle punching, onto which the air-inlet layer was then superposed and laminated by needle punching, thereby obtaining a triple-layered sheet material as shown in FIG. 2. This sheet material is then resin-impregnated in the same manner as in Example 1 to finally obtain an air-filtering material of 316 g/m$^2$ in weight and 2.7 mm in thickness.

The air-filtering materials prepared in Examples 1–4 were subjected to tests in a manner prescribed by JIS (Japanese Industrial Standards) D-1612 to measure initial cleaning efficiency, initial pressure loss, full-life cleaning efficiency and D.H.C. (dust-holding-capacity) value thereof. The test results obtained are shown in the following Table I.

TABLE I

| EXAMPLE | 1 | 2 | 3 | 4 |
|---|---|---|---|---|
| INITIAL CLEANING EFFICIENCY | 98.4 | 98.6 | 98.5 | 98.32 |
| INITIAL | 13 | 14 | 14 | 13 |

TABLE I-continued

| EXAMPLE | 1 | 2 | 3 | 4 |
|---|---|---|---|---|
| PRESSURE LOSS | | | | |
| FULL-LIFE CLEANING EFFICIENCY | 99.24 | 99.31 | 99.4 | 99.13 |
| D.H.C. VALUE ($\Delta P = 100$ mm Ag) | 18.21 | 28.02 | 27.99 | 30.65 |

For comparison, the prior art air-filtering materials the subjected to the same tests to obtain the results shown in the following Table II. No. 1 prior art air-filtering material is a composite one of a total weight of 245 g/m$^2$ in which two sheets of needle punching type nonwoven fabrics are laminated on one another, the air-outlet side layer being impregnated with a large quantity of acrylic ester resin. Prior art No. 2 is similar to No. 1 but the air-outlet side layer had a greater web density and is impregnated with a still larger quantity of acrylic ester resin. Prior art No. 3 comprises a thick, wet type, filtering paper which has generally been used in an air filter in an automobile engine.

TABLE II

| PRIOR ART | 1 | 2 | 3 |
|---|---|---|---|
| INITIAL CLEANING EFFICIENCY | 95.8 | 97.8 | 98.0 |
| INITIAL PRESSURE LOSS | 13 | 18 | 18 |
| FULL-LIFE CLEANING EFFICIENCY | 99.2 | 98.69 | 99.07 |
| D.H.C. VALUE ($\Delta P = 100$ mm Ag) | 23.57 | 19.57 | 4.26 |

It can be noted from comparison of the test data shown in Table I and Table II that the air-filtering material prepared in accordance with the invention has improved cleaning characteristics and a longer life span.

Although the invention has been described in connection with some specific embodiments and examples, it is to be understood that many variations and modifications can be made without departing from scope of the invention as defined in the appended claims.

What we claim is:

1. Air-filtering material for use in an air filter, comprising at least one nonwoven fabric wherein fiber staples are interlocked with each other by water jet method and at least one fiber assembly, said nonwoven fabric being laminated on said fiber assembly by needle punching and positioned on an air outlet side of the air filter.

2. Air-filtering material as claimed in claim 1 wherein said fiber staples in said nonwoven fabric has an average fiber diameter of 2 denier or less.

3. Air-filtering material as claimed in claim 2 wherein said fiber assembly comprises fibers having an average fiber diameter substantially greater than that in said nonwoven fabric.

* * * * *

UNITED STATES PATENT AND TRADEMARK OFFICE
CERTIFICATE OF CORRECTION

PATENT NO. : 5,198,294

DATED : March 30, 1993

INVENTOR(S) : Takuichiro MASUDA, Norio UMEZU and Yutaka SAISHO

It is certified that error appears in the above-identified patent and that said Letters Patent is hereby corrected as shown below:

Column 1, line 67, "efficiently" should read --efficienty--.

Column 2, line 34, after "type" insert --nonwoven--.

Column 4, line 10, "2.5" should read --2.7--.

Signed and Sealed this

Twenty-first Day of March, 1995

*Attest:*

BRUCE LEHMAN

*Attesting Officer*       *Commissioner of Patents and Trademarks*